United States Patent [19]
Essop et al.

[11] Patent Number: 5,512,171
[45] Date of Patent: Apr. 30, 1996

[54] PARTICLE SEPARATOR

[76] Inventors: Saleam Essop; Allen G. Bullard, both of P.O. Box 1638, Hillcrest 3650, South Africa

[21] Appl. No.: 381,477

[22] Filed: Jan. 31, 1995

[51] Int. Cl.⁶ .................... C02F 1/24; C02F 1/465
[52] U.S. Cl. ............... 210/221.2; 204/275; 204/232; 210/707; 210/748; 205/757
[58] Field of Search ................. 210/221.2, 243, 210/748, 707, 192; 204/149, 302, 275

[56] References Cited

U.S. PATENT DOCUMENTS

| | | |
|---|---|---|
| 3,479,281 | 11/1969 | Kikindai . |
| 3,523,891 | 8/1970 | Mehl . |
| 3,664,951 | 5/1972 | Armstrong . |
| 3,756,933 | 9/1973 | Greenberg . |
| 3,767,046 | 10/1973 | Hartkorn . |
| 4,623,436 | 11/1986 | Umehara . |

FOREIGN PATENT DOCUMENTS

| | | |
|---|---|---|
| 52-46576 | 4/1977 | Japan . |
| 819065 | 5/1981 | U.S.S.R. . |
| 1096231 | 6/1984 | U.S.S.R. . |
| 1194846 | 11/1985 | U.S.S.R. . |

*Primary Examiner*—Thomas M. Lithgow
*Attorney, Agent, or Firm*—Phelps Dunbar

[57] ABSTRACT

This invention relates to a separator device for the separation of fine particles from a contaminated liquid. The device utilizes the process of electrolysis to produce small gas bubbles which attach themselves to the fine particles and move the particles to the top of the liquid surface where they can be easily removed. The separation is facilitated by the use of baffles which prevent the formation of convection currents in the body of the separator device, and by inclined plates which direct the rising particles towards the removal point.

1 Claim, 5 Drawing Sheets

PARTICLE SEPARATOR

DISCLOSURE

The following disclosure concerns generally particle separators, and more specifically a particle separator designed for removal of fine particles from a contaminated liquid using small gas bubbles generated using an electrode assembly and electrically charged plates and baffles.

DESCRIPTION OF THE PREFERRED EMBODIMENT

Figure 1:
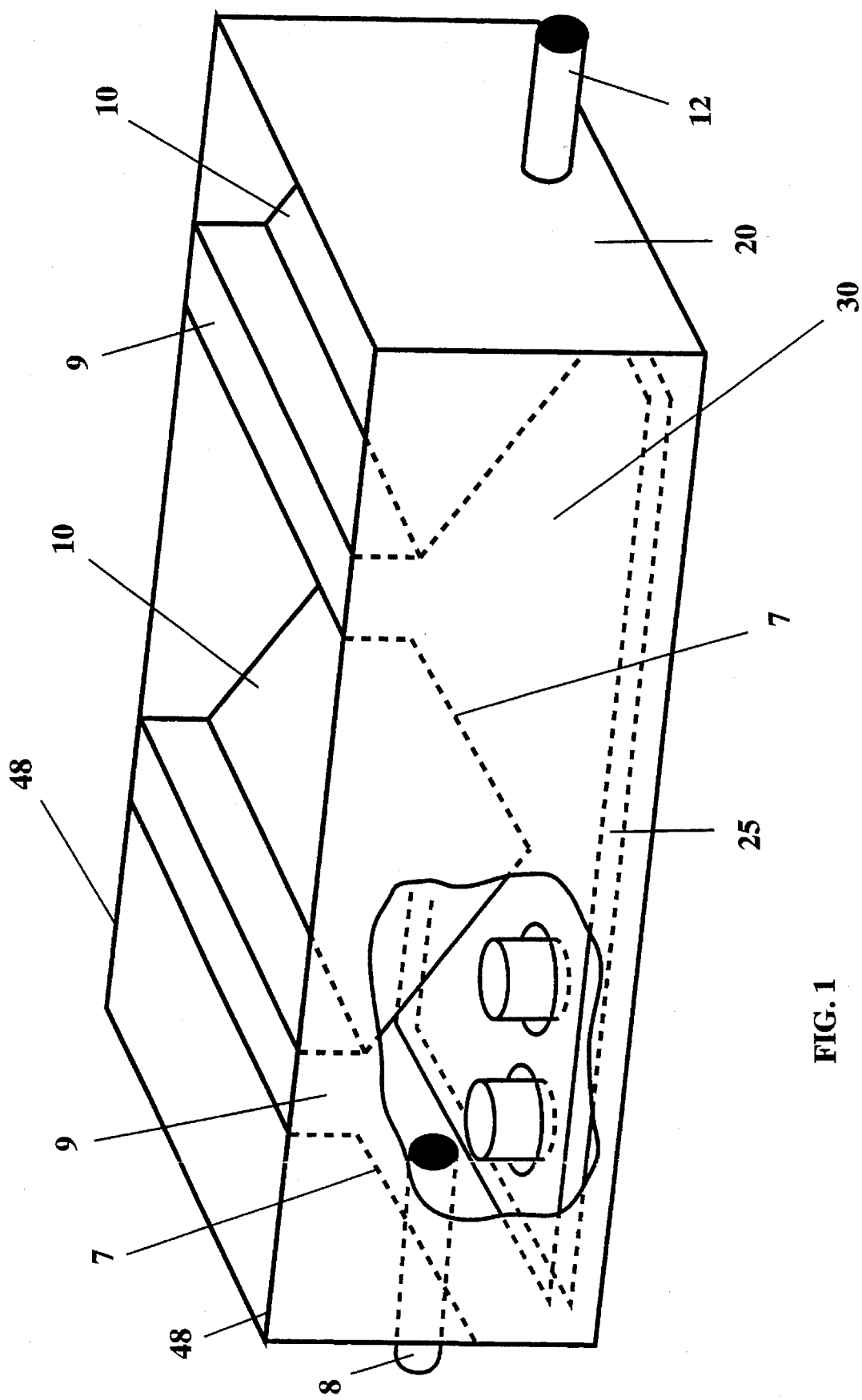
FIG. 1 is a perspective view of the electrode assembly within the separator vessel.

The preferred embodiment of the device is shown in the attached drawings and is described as follows:

FIG. 1 is a perspective view of the electrode assembly (25) within the separator vessel (20). Situated within the separator vessel (20) are inclined plates (7 and 10) which define a separation zone (30). A separator vessel (20) may contain one or more separator zones (30) defined by inclined plates (7 and 10). Inclined plates (7 and 10) are electrically charged such that small gas bubbles are formed on the underside of plates (7 and 10). These bubbles (not shown) serve to dislodge any contaminate particles which may accumulate on the side of plates (7 and 10). The bubbles attach themselves to the contaminate particles, and cause the contaminate particles to rise into the contaminate removal zone (9). Means (not shown) are provided for removing the contaminate particles which gather at the top of the contaminate removal zone. This means may be a skimmer or other similar well known devices. Contaminated liquid enters the separator vessel (20) through inlet pipe (8) and exits the separator vessel (20) through exit pipe (12). Adjacent the floor of the separator vessel (20) is electrode assembly (25). Electrode assembly (25) is shown in greater detail in FIG. 2. Additional detail of the separator zones (30) is shown in FIG. 3.

Figure 2:
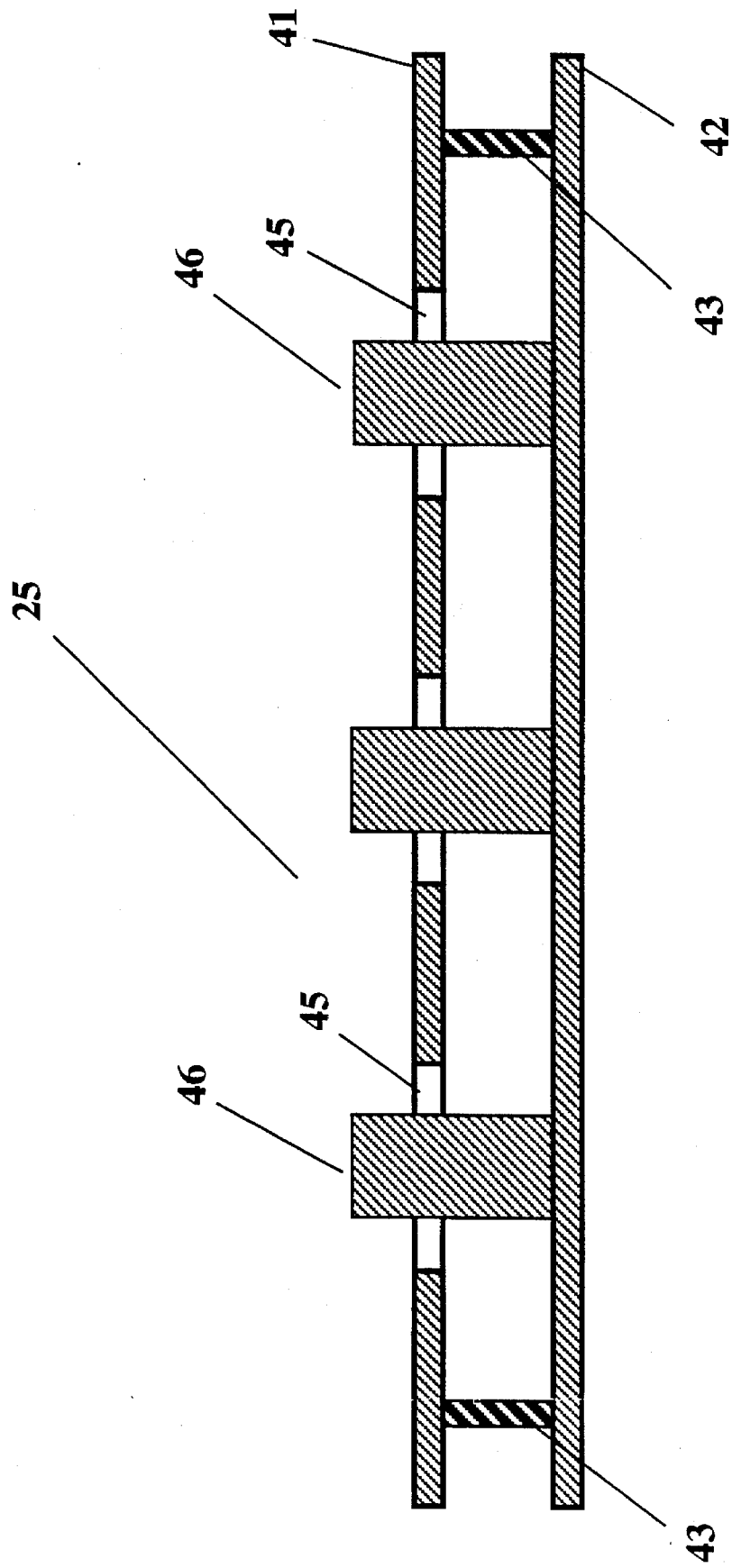
FIG. 2 is a cross sectional view of the electrode assembly.

FIG. 2 is a cross sectional view of the electrode assembly (25). The electrode assembly consists of two electrically charged plates (41 and 42) which are separated by insulating pins (43). The insulating pins (43) also serve to properly locate the electrically charged plates (41 and 42) relative to each other. One of the electrically charged plates is negatively charged and the other electrically charged plate is positively charged, resulting in the production of small gas bubbles on the surface of the plates. In addition, one or more electrode studs (46) may be attached to the lower electrically charged plate (42). The electrode studs (46) project upward through openings (45) in the upper electrically charged plate (41). In this manner, when electric current is applied between the electrically charged plates (41 and 42), an intensity of micron sized gas bubbles is produced in the area around the electrode studs (46).

Figure 3:
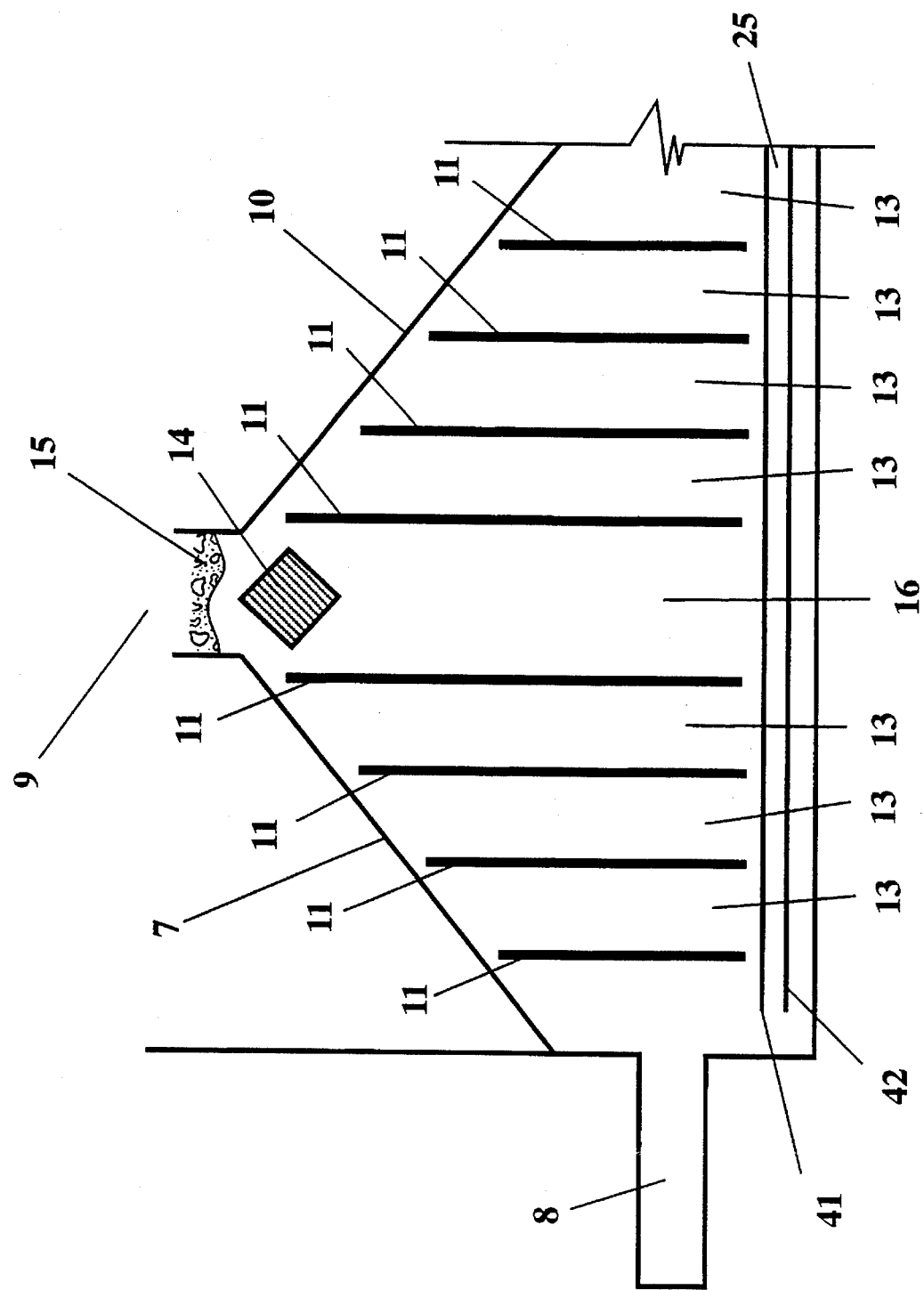
FIG. 3 is a cross sectional view of the separation zones.

FIG. 3 is a cross sectional view of the separation zones (30). Baffles (11) are provides along the separation zones (30) formed by converging inclined plates (7 and 10). The baffles (11) extend along the width of the separator vessel (20), transverse to the flow of liquid through the separator vessel from inlet pipe (8) to exit pipe (12). The baffles (11) act in conjunction with inclined plates (7 and 10) to prevent the formation of convection currents within the separator zones (30) due to the passage of liquid and rising gas bubbles. The height of the baffles (11) follow the general incline of inclined plates (7 and 10). The top of each baffle (11) forms a gap of approximately two inches between the baffle (11) and the inclined plates (7 and 10). The baffles (11) are attached to and supported by the sides (48) of the separator vessel (20). The baffles (11) are also situated at a variable distance from the upper electrode plate (41) to permit the passage of liquid across the upper electrode plate (41). In addition, a stabilization baffle (14) is located near the point of closest convergence of the inclined plates (7 and 10), and just below the contaminate removal zone (9). The stabilization baffle (14) has a cross sectional shape of a diamond, with a point of the diamond directed toward the floor of the separator vessel (20). The stabilization baffle (14) may be electrically charged, generating gas bubbles which serve to prevent the formation of convection currents in the central portion (16) of the separation zones (30). The stabilization baffle (14) further prevents the bombardment and subsequent disturbance of the gathered contaminate particles (15) which have been carried to the contaminate removal zone (9) as a result of rapidly rising gas bubbles in the separation zone (30).

Figure 4:
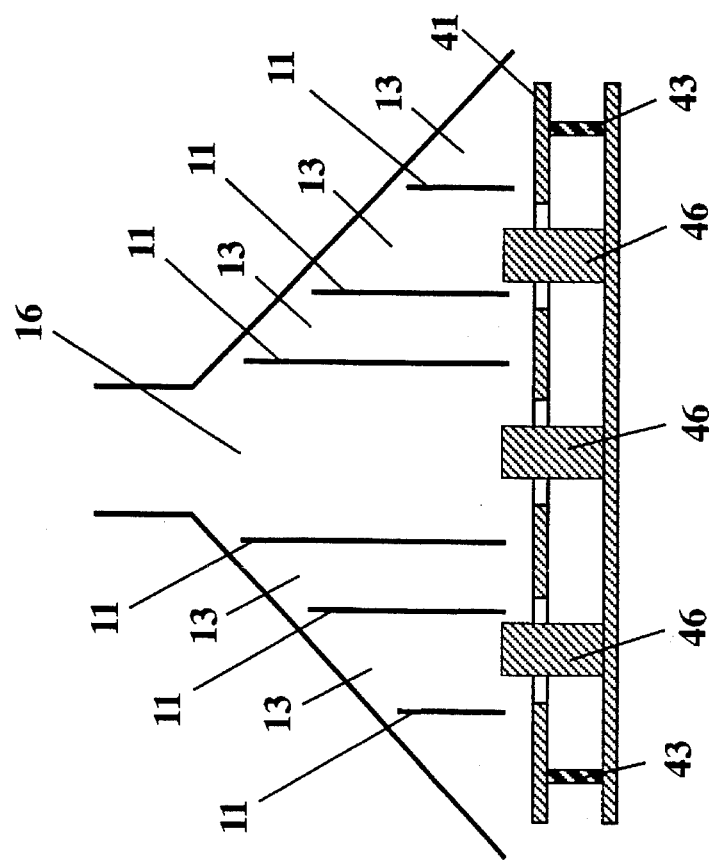
FIG. 4 is a cross sectional view showing the relative positions of the baffles and the electrode studs.

FIG. 4 is a cross sectional view showing the relative positions of the baffles (11) and electrode studs (46). The electrode studs (46) protrude through the openings (45) in the upper electrode plate (41). The electrode studs (46) are aligned such that they are centrally located in the spaces (13 and 16) created by the baffles (11). This provides for a concentrated flow of micron sized gas bubbles rising from the electrode stud (46) up through the space (13) between the baffles (11).

Figure 5:
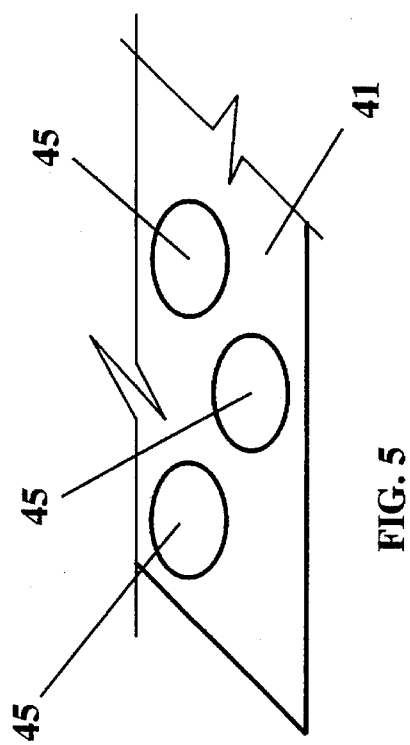
FIG. 5 is a perspective view of the upper electrode plate.

FIG. 5 is a perspective view of the upper electrode plate (41) showing the openings (45) through which the electrode studs (46) protrude.

Figure 6:
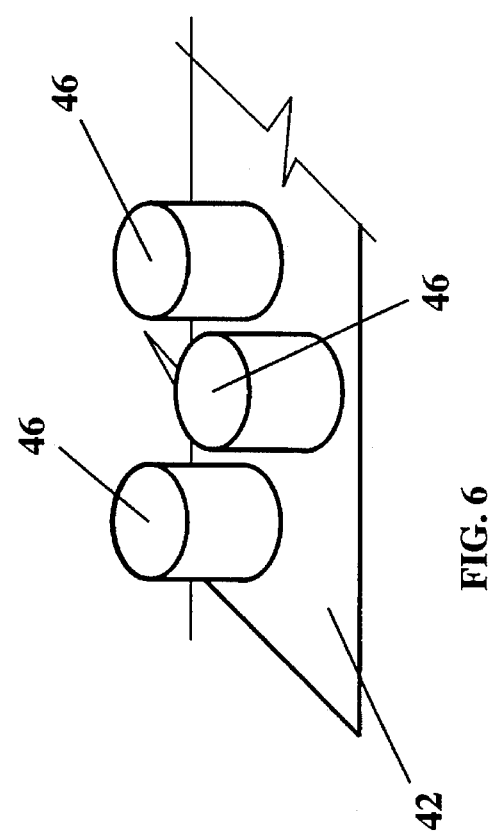
FIG. 6 is a perspective view of the lower electrode plate.

FIG. 6 is a perspective view of the lower electrode plate (42) showing the electrode studs (46) which protrude through the openings (45) in the upper electrode plate (41).

Figure 7:
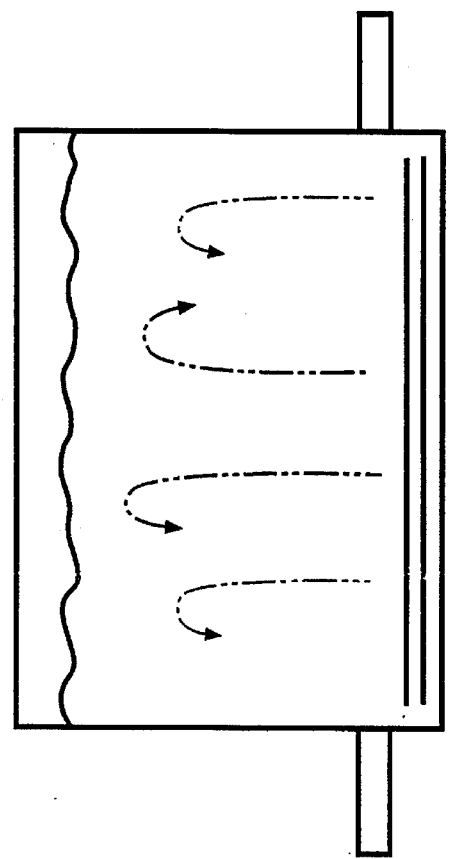
FIG. 7 is a cross sectional view of convection currents.

FIG. 7 is a cross sectional view of convection currents (shown as arrows) which are set up in a conventional electrolytic cell system.

Figure 8:
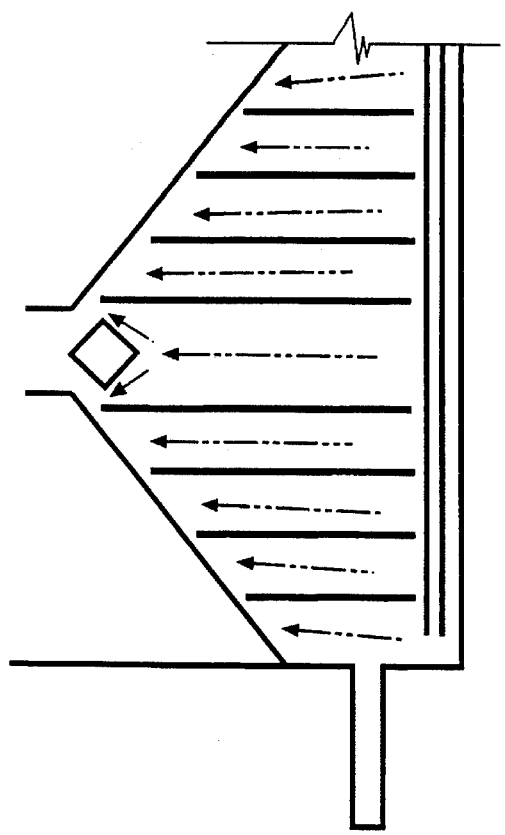
FIG. 8 is another cross sectional view of the separation zone.

FIG. 8 is a cross sectional view of the separation zone (30) of the separator vessel (20) showing how convection currents are suppressed in the separation zone (30) by baffles (11) and stabilization baffle (14). Particle flow is shown by arrows.

What we claim is:

1. A particle separator device comprising, a separator vessel, one or more separation zones formed within said separator vessel by converging inclined plates which extend the entire width of the separator vessel, a contaminate removal zone located just above the point of closest convergence of said converging inclined plates, means for removing contaminate particles from said contaminate removal zone, inlet means for introducing contaminated liquid into one end of said separator vessel, exit means for removing purified liquid from the end of said separator vessel opposite said inlet means, an electrode assembly comprised of upper and lower electrode plates, said upper electrode plate formed with one or more openings, said lower electrode plate having one or more electrode studs which protrude upwardly through said openings in said upper electrode plate, said electrode assembly being located on the floor of said separator vessel below the lower end of said converging inclined plates, one or more vertically oriented baffles located in said separation zones, said baffles being places such that said electrode studs are centrally located in the spaces between said baffles, a stabilization baffle located near the point of closest convergence of said converging inclined plates and just below said contaminate removal zone, means for electrically charging said upper and lower electrode plates, whereby an intensity of micron sized gas bubbles are produced proximate said electrode studs, means for electrically charging said converging inclined plates whereby gas bubbles are formed on the underside of said converging inclined plates, and means for electrically charging said stabilization baffle whereby gas bubbles are formed on said stabilization baffle.

\* \* \* \* \*